United States Patent Office 3,175,898
Patented Mar. 30, 1965

3,175,898
METHOD FOR REDUCING SPRAY DRIFT IN APPLYING PLANT GROWTH REGULATING AGENTS
Keith G. Seymour and Billy G. Harper, Lake Jackson, Tex., assignors to The Dow Chemical Company, Midland, Mich., a corporation of Delaware
No Drawing. Filed Mar. 3, 1961, Ser. No. 93,013
4 Claims. (Cl. 71—2.7)

This invention relates to agricultural chemistry and is more particularly concerned with various aqueous mixtures whereby reduced drift loss of aqueous soluble and dispersible herbicides, fungicides, insecticides, growth regulating chemicals, and the like biologically active agents, is accomplished in applications of such chemicals.

This application is a continuation in part of our copending application Serial No. 12,965, filed March 7, 1960, now abandoned.

Generally, biologically active chemicals are applied in agricultural applications through the use of portable spray mechanisms, e.g., ground and aerial spray applicators. However, because of potential damage to adjacent areas through wind drift of the sprayed particles, economical aerial spray techniques can be carried out in many areas only when certain specific atmospheric conditions prevail. For example, in spraying herbicides there is the problem of killing desired as well as unwanted vegetation. The smaller particles of the sprayed herbicide composition will drift a considerable distance depending on the particle size and the velocity of the wind. The active compounds in these weed killers are extremely potent, even in very small quantities. The damage to a crop, neighboring the sprayed area, may vary from reduced yield to an outright kill, depending upon the amount of compound reaching the plant, the plants' sensitivity, the stage of development of the plants and other variables. The problem is further aggravated by the addition of agents to the formulation of the spray to increase the coverage.

A similar problem has been encountered in the application of insecticides to certain non-edible crops in fields adjacent to other crops used as fodder for livestock. For example, in the accidental spraying of a dichloro-diphenyl-trichloroethane composition on alfalfa which later was fed to cattle, residues of the insecticide on this crop made it unfit for dairy cattle as these residues were found in the milk; see J. Ag. Food Chem., vol. 7, No. 10, October 1959, p. 679.

In certain areas, predominantly the west, where checkerboard agriculture is the pattern, this spray drift problem is acute. The seriousness of the problem is emphasized by the existence of laws in many States controlling the use and application of agricultural and horticultural sprays and insecticides.

Many attempts have been made to solve this problem. Changes have been made in the design of spray nozzles and additives have been used in the attempt to prevent the production of extremely fine particles. The use of additives which thicken the solution, such as Carbabol, a trademarked polycarboxylic acid product made by B. F. Goodrich Co., and carboxymethyl cellulose, however, do not effectively inhibit the production of fine particles by the nozzle.

Another attempt at solving this problem, which has met with some success, is the formation of an invert emulsion. However, there is some difficulty encountered in making such emulsions of the right consistency and the coverage is not as complete as desired when a herbicide is applied in this way. It is to minimize drift during application that the present invention is directed.

It is a principal object of the present invention to reduce the application loss normally encountered because of wind drift of sprayed aqueous solutions of herbicides, fungicides, insecticides, growth regulators and the like biologically active agents. Another object of the present invention is to provide an aqueous solution or dispersion of such agricultural chemicals in combination with a swellable polymer whereby substantially reduced drifting of its spray is accomplished. Still a further object of the present invention is to provide an aqueous composition of matter containing a water soluble or dispersible herbicidal material and the like in combination with a crosslinked, substantially water-swellable polymer. An additional object of the present invention is to provide a composition containing a herbicidal, insecticidal or fungicidal commodity which can be successfully administered by aerial application, which composition does not suffer appreciable spray drift during administartion. Other objects and advantages will become apparent hereinafter.

The foregoing and additional objects are accomplished by providing an aqueous dispersion containing an effective quantity of a water dispersible or water soluble herbicide, fungicide, insecticide, growth regulator or other biologically active agent and containing from about 0.10 to about 20 percent by weight or more of a substantially water-insoluble, water-swellable, crosslinked polymer.

Preferably, crosslinked monovalent cation salts of polyacrylic acid will be utilized as a gelling agent for these solutions and dispersions, although any crosslinked polymer whose linear analogue is water-soluble can be used, e.g., crosslinked polyglycols having average molecular weights of from about 1000 up to a million or more, crosslinked substantially water-insoluble, water-swellable, sulfonated alkaryl and aromatic polymers, for example, cross-linked sulfonated polyvinyl toluene, and copolymers of such sulfonated alkaryl and aromatic materials with acrylonitrile, alkylacrylonitriles and methacrylates and other crosslinked water-swellable polymers can be employed.

The substantially water-insoluble, water-swellable, cross-linked polyacrylate salts as used in the present invention are prepared by chemical crosslinking as shown in British Patent 719,330 or by subjecting a mixture of a monovalent cation salt of acrylic acid and water to the influences of high-energy ionizing radiation for a period of time sufficient to effect the desired polymerization and the cross-linking of at least a portion of the polymer produced. Generally speaking, the amount of ionizing radiation should be at least 0.5 megarad but greater or lesser amounts may be employed. In any event, the amount of radiation must be great enough to give a swellable polymer which takes in water or aqueous solutions and in so doing increases in volume, but which generally retains its original shape. It is critical to the composition of the present invention that the salt-forming cation of such polyacrylate resin be monovalent. Representative examples of monovalent cations include, for example, the alkali metals, i.e., sodium, potassium, lithium, rubidium and cesium, as well as water soluble ammonium and ammonium-like radicals based upon the quarternary nitrogen atom.

While aqueous pesticidal dispersions and solutions containing as low as 0.10 percent of the crosslinked alkali polyacrylate salt based on the weight of the dispersion or solution will show some improvement in spray drift loss of the sprayable aqueous dispersions, it is preferred to use quantities of at least about 0.5 to 10.0 percent based on the weight of the dispersion. The amount to be employed will depend upon the kind and amount of pesticide to be used. In any event, an amount of cross-linked, water-swellable, water-insoluble polymer should be used such that a dispersion results which contains no substantial amount of free liquid. The dispersions, made up of discrete, elastic particles which do not coalesce on contact, are conveniently characterized by the term "granular liquid." Thus, the dispersions of this invention form a particulate, gelled mass which contain substantially no free liquid.

In the procedure of the present invention, an aqueous solution or dispersion of a water soluble or water dispersible herbicide, fungicide, insecticide, growth regulator or other biologically active agent is provided and the cross-linked polyacrylate salt mixed with this so that a swelled-gel results. Generally, this mixing is accomplished by merely adding the resin to the aqueous dispersion with agitation, provided that the agitation is not of sufficient magnitude to cause significant shearing of the polymer to particle sizes lower than about 0.05 mm. diameter. Advantageously, the gelled solution can be prepared by first pulverizing the polyacrylate salt to a desired particle size, such as will produce a swelled particle within the range of about .05 mm. to about 1.0 mm. in diameter, and then mixing the so-prepared powder into the aqueous solution with stirring. It is understood that the amount of swelling of the particles is dependent upon the particular polymer employed and the extent to which the polymer is cross-linked.

Alternatively, chunks of the polymer can be added to an aqueous solution or dispersion of the pesticide. This produces a gel-like mass as the polymer swells. This mass then can be broken up by vigorous stirring to give a gel structure of discrete gelled particles the same as are obtained by adding the pulverized polymer to the aqueous solution.

Another variable which provides still a third alternative of gel preparation is the spray equipment itself. The size of the spray nozzle and the atomizing pressure on it can be varied so that the sprayed particles are sheared to the proper range of sizes while passing through the nozzle. Here the sprayer itself may act also as the stirring device.

The discrete, swelled polymer particles which make up the gel structure of this invention hold the dispersion of chemical. Since the biologically active agent is integrally bound by the gel structure, it is carried with the gel particles through the spray system and onto the sprayed surface. Advantageously, the sprayed particles are kept within a certain size range of from about 0.05 mm. to about 1.0 mm. and more particularly between about 0.12 mm. and 1.0 mm. although sprayed particles of somewhat larger diameter may be utilized in certain applications.

Quantities of water dispersible pesticide to be employed are those quantities which are effective. By this is meant those quantities which would normally be employed in such biologically active compositions of the prior art, since the compositional matter of the present invention usually does not affect the biological activity of the active compound. Understandably, it is essential that the compatability of the pesticide formulation and the polymer used be considered in the utilization of the invention.

Of course, an admixture of appropriate proportions of a suitable unswelled polymer with a suitable pesticide has utility, since this substantially dry mix can be added to water to achieve the results of the present invention.

An unclassified particulate cross-linked polymer resin can be mixed with the pesticide and this mixture then added to water. Alternatively and advantageously the resin first can be screened to a desired particle size; the so-classified polymer can be mixed with the pesticide; and, this mixture then can be placed in water, preferably with stirring, to give the pesticide in a gelled dispersion of preselected swelled particle size.

In these dry mixtures, it is to be understood that the amount of the water-swellable, water-insoluble, cross-linked polymer in the dry mixture is such that the gelled dispersion as produced in water contains from about 0.1 to about 20 weight percent of the dispersion weight of the resin.

The amount of the pesticide in the dry mixture is a predetermined effective quantity shown to produce the desired result upon application of the resulting dispersion.

Additionally, if desired, surface active agents, wetting agents and dispersion promoters can be incorporated into the blend to promote wetting and correspondingly to move readily disperse the aqueous insoluble biologically active agents throughout the gelled product resulting from mixing the dry blend and water.

To further illustrate the utility of these mixes, a typical dry blend comprising about 1.7 pounds of particulate cross-linked polypotassium acrylate (particle size predetemined to give swelled particle ranging from about 0.2–0.5 millimeter diameter) and 4.4 pounds of sodium 2,4-dichlorophenoxyacetate are dry blended by mechanical mixing. The resulting mixture then is made up to 5 gallons of water. Preferably, this addition is carried out while agitating the water. The resulting swelled gelled dispersion is substantially the same as is achieved by adding the corresponding cross-linked polymer resin alone to an aqueous solution of the herbicide.

Additionally, amounts of non-swelled, cross-linked polymer equivalent to from about 0.0085 to about 1.7 pounds per gallon of dispersion can be dry blended with effective amounts of biologically active agents either with or without the addition of wetting and dispersing agents to prepare useful dry blends of gelling materials and biologically active compositions.

The following examples are given to illustrate the present invention but are not to be construed as limiting the invention thereto.

EXAMPLE 1

An evaluation of spray drift control of the sodium salt of 2,4-dichlorophenoxyacetic acid was carried out as follows:

A mixture of sodium 2,4-dichlorophenoxyacetate in deionized water (0.011 pound of salt per gallon water which is an effective dosage as normally applied in high volume applications) containing a trace of sodium fluorescein was prepared. Samples of this mix then were taken and gelled or thickened by addition of one of the following materials thereto, (1) Polyammonium acrylate crosslinked by irradiation, screened to 48–100 mesh size, 3.0 g. of the acrylate to 300.0 ml. solution. (Viscosity 4200 centipoises by Brookfield viscometer.)

(2) Polyglycol (molecular weight of about 20,000) crosslinked with toluene diisocyanate, screened to 48–100 mesh size, 7.8 g. to 300.0 ml. solution. (Viscosity 3700 centipoises by Brookfield viscometer.)

(3) Poly(trimethyl(ar-vinylbenzyl) ammonium chloride) crosslinked microgel screen to 48–100 mesh size of aggregates, 9.0 g. to 300.0 ml. solution. (Viscosity 7400 centipoises by Brookfield viscometer.)

(4) Carboxymethyl cellulose, commercial sample, non-crosslinked. 3.0 g. to 300 ml. solution. (Used for comparison purposes.) (Viscosity 1700 centipoises by Brookfield viscometer.)

(5) Partially sulfonated polyvinyl toluene, H+ form, not crosslinked. 1.89 g. to 300 ml. solution. (Used for comparison purposes.) (Viscosity 6600 by Brookfield viscometer.)

To evaluate the effectiveness of spray drift control of these compositions, an electric fan was mounted on a stand about 4 feet above the ground and was so positioned that a stream of air issued horizontally from the blade. The air velocity as measured 10 feet away from the fan and directly in front of the blade was about 10–11 miles per hour. The natural wind velocity as measured 15 feet to the side of the fan was about 6.5 to about 7.5 miles per hour.

Filter papers, 15 cm. in diameter, were laid out on the ground in front of the fan in a grid pattern. This pattern was made up of three parallel traverses, spaced 28 inches apart, the first of which was centered below the path and in the direction of the air stream issuing from the fan, while the second and third traverses extended laterally outward to one side of the fan. In the first traverse, the filter papers were placed at distances of 4, 7, 10, 13, 19 and 25 feet out from the spray point. The papers were placed in the second and third traverse at points where a line perpendicular from each of the papers in the first traverse crossed these latter two traverses.

A mixture to be sprayed was loaded into the reservoir of a DeVilbiss air-gun, Series 501, Type TGA, which had been modified to obtain a constant pressure on the reservoir as well as the nozzle. The mixtures were sprayed directly into the air flow at the front of the fan with the nozzle positioned at right angles to the direction of air movement and also positioned on the opposite side of the rows of filter paper. Thus the mixture was sprayed at right angles and directly into the airflow. A pressure of 25 p.s.i. was maintained on the nozzle and 5 p.s.i. was maintained on the reservoir. Spraying was continued for 5 seconds. Following this, the filter papers were collected, air-dried at room temperature, and the number of spray droplets, made fluorescent by the sodium fluorescein, per unit area was determined by reading these under an ultraviolet light.

In Table 1 is presented the spray drift results obtained using the gelled and thickened mixes as well as those obtained from a non-gel containing control. These show the effectiveness of the crosslinked polymers in reducing drift as compared to the effect of linear thickening agents, and, more particularly, point out the utility of the crosslinked polyacrylate salts. Additionally, these results give an indication as to the shearing action on the gel particles by the spray nozzle as the total number of spots per area also gives a qualitative measure of spray drop size.

EXAMPLE 2

A dry blend of the weed and brush killers was made for the purpose of preparing a sprayable dispersion useful in killing brush and grass along railroad rights-of-way. A mixture of 18.8 pounds of the sodium salt of 2,2-dichloropropionic acid was mixed with 2 gallons of a solution containing 4.0 lbs./gal. of 2,4-dichlorophenoxyacetic acid and 3.75 lbs of a liquid polyglycol. To this was added 33.2 lbs. of polypotassium acrylate crosslinked polymer. The ingredients were thoroughly mixed and blended. Just prior to use this mixture was made up with water to 20 gals. of dispersion.

EXAMPLE 3

A slurry of 10.4 lbs. crosslinked polyacrylic acid, 14.6 lbs. of triethylamine, and 6.85 gals. of the triethylamine salt of 2,4,5-trichlorophenoxyacetic acid was prepared. Prior to use this formulation was diluted to 20 gals. of dispersion with water.

*Table 1.— Spray drift measurement*

TRAVERSE 1

| Run No. | Gelling Agent | Number of Fluorescent Spots/Square Inch Paper Distance from Spray Source—Feet | | | | | |
|---|---|---|---|---|---|---|---|
| | | 4 | 7 | 10 | 13 | 19 | 25 |
| 1 | Polyammonium acrylate (PAA) | 0.3 | 16.0 | 64.0 | 80.0 | 29.0 | 0.6 |
| 2 | Polyglycol-toluene diisocyanate (PTD) | 0.1 | 73.0 | 54.0 | 34.0 | 9.0 | 4.0 |
| 3 | Poly (trimethyl) [ar-vinylbenzyl] ammonium chloride [TMBA] | 0.1 | 111.0 | 90.0 | 62.0 | 28.0 | 58.0 |
| 4 | Carboxymethyl cellulose (CMC) | 0.1 | 10.0 | 136.0 | 320.0 | 302.0 | 242.0 |
| 5 | Sulfonated polyvinyl toluene (SPVT) | 13.0 | 66.0 | 173.0 | 148.0 | 134.0 | 96.0 |
| 6 | Control (Brookfield Viscosity 1 to 2 centipoises) | 0.8 | 11.0 | 54.0 | 125.0 | 266.0 | 174.0 |

TRAVERSE 2

| Run No. | Gelling Agent | 4 | 7 | 10 | 13 | 19 | 25 |
|---|---|---|---|---|---|---|---|
| 7 | PAA | 8.0 | 16.0 | 24.0 | 37.0 | 5.0 | 2.0 |
| 8 | PTD | 52.0 | 150.0 | 11.0 | 32.0 | 11.0 | 0.1 |
| 9 | TMBA | 144.0 | 130.0 | 130.0 | 74.0 | 76.0 | 18.0 |
| 10 | CMC | 1.0 | 138.0 | 397.0 | 294.0 | 301.0 | 200.0 |
| 11 | SPVT | 5.0 | 51.0 | 142.0 | 214.0 | 109.0 | 103.0 |
| 12 | Control | 1.0 | 1.0 | 107.0 | 226.0 | 170.0 | 144.0 |

TRAVERSE 3

| Run No. | Gelling Agent | 4 | 7 | 10 | 13 | 19 | 25 |
|---|---|---|---|---|---|---|---|
| 13 | PAA | 0.2 | 0.4 | 0.03 | 0.03 | 0.01 | 0.004 |
| 14 | PTD | 63.0 | 60.0 | 0.06 | 0.0 | 0.0 | 0.03 |
| 15 | TMBA | 34.0 | 34.0 | 35.0 | 0.2 | 12.0 | 3.0 |
| 16 | CMC | 18.0 | 66.0 | 45.0 | 10.0 | 48.0 | 56.0 |
| 17 | SPVT | 11.0 | 50.0 | 45.0 | 40.0 | 165.0 | 94.0 |
| 18 | Control | 0.06 | 1.6 | 14.0 | 0.0 | 14.0 | 6.0 |

In a manner similar to that of the foregoing examples, other monovalent salts of polyacrylic acid may be substituted for the ammonium salt specifically shown, such as, for example, sodium potassium, rubidium, cesium, methylammonium, ethylammonium, dimethylammonium, etc., with similar results obtained for those obtained with the ammonium salts. Also other biologically active agents such as, for example, naphthalene acetic acid and salts thereof, naphthalene acetamide, indolebutyric acids and salts thereof, esters of 2,4-dichlorophenoxy acetic acid, esters of 2,4,5-trichlorophenoxyacetic acid, 2-methyl-4-chlorophenoxyacetic acid, 2,2-dichloropropionic acid, trichloroacetic acid and salts thereof, dinitro-o-sec-butylphenol and salts thereof, aminotriazole, which are herbicides and/or plant growth regulators; fungicides such as N-trichloromethylmercapto-4-cyclohexen-1,2-dicarboximide, ferric dimethyldithiocarbamate, zinc ethylene bisdithiocarbamate; insecticides such as dichlorodiphenyltrichloroethane, dieldrin, aldrin, tetraethylphosphate, O,O-diethyl O-2-(ethylthio)ethyl thiophosphate, O,O-dimethyl dithiophosphate of diethyl mercaptosuccinate, endrin and the like may be employed with similar results. Further, other water-insoluble, water-swellable, crosslinked polymers, e.g., sulfonated crosslinked polyvinyltoluene, and crosslinked copolymers of such sulfonated alkaryl and aromatic materials with acrylonitrile, alkylacrylonitriles and methacrylates and other like crosslinked water-insoluble water-swellable polymers may be substituted for those polymers specifically shown with similar results. Any of the crosslinked, water-swellable, substantially water insoluble polymers as herein suggested can be used as a gelling agent with aqueous dispersions of any of the

We claim:

1. A method for reducing spray drift in applying a biologically active plant growth regulating agent which comprises spraying a plant growth regulating amount of a plant growth regulating gel, said gel produced by mixing an aqueous dispersion containing an effective amount of a biologically active plant growth regulating agent with from about 0.2 to about 5.0 percent, based on the weight of the total dispersion, of a particulate cross-linked, water-swellable, water-insoluble alkali metal salt of polyacrylic acid thereby producing an elastic, non-coalescent, particulate, sprayable gel of discrete, swelled gel particles having substantially no free liquid, said particles having an effective diameter of from about 0.05 to about 1.0 millimeter.

2. A method for reducing spray drift in applying a biologically active plant growth regulating agent which comprises spraying a plant growth regulating amount of a plant growth regulating gel, said gel produced by mixing an equeous dispersion containing an effective amount of a biologically active plant growth regulating agent with from about 0.2 to about 5.0 percent, based on the weight of the total dispersion, of a particulate, cross-linked, water-swellable, water-insoluble, polyammonium acrylate polymer thereby producing an elastic, non-coalescent, particulate, sprayable gel of discrete, swelled gel particles having substantially no free liquid, said particles having an effective diameter of from about 0.05 to about 1.0 millimeter.

3. A method for reducing spray drift in applying a biologically active plant growth regulating agent which comprises spraying a plant growth regulating amount of a plant growth regulating gel, said gel produced by mixing an aqueous dispersion containing an effective amount of a biologically active plant growth regulating agent with a sufficient amount of a cross-linked, water-swellable, water-insoluble polymer to provide a particulate, gelled dispersion of discrete, elastic, non-coalescent particles of said polymer with said aqueous dispersion of said biologically active plant growth regulating agent, said particulate, gelled dispersion having substantially no free liquid, the discrete particles of said gelled dispersion having an effective diameter of from about 0.05 to about 1.0 millimeter.

4. A method for reducing spray drift in applying aqueous dispersions of a herbicide to undesired vegetation which comprises spraying a herbicidally effective amount of a herbicide gel, said gel produced by mixing an aqueous dispersion containing an effective amount of a herbicide with from about 0.5 to about 10 percent, based on the weight of the total dispersion, of a particulate cross-linked, water-swellable, water-insoluble polymer thereby producing an elastic non-coalescent particulate sprayable gel of discrete, swelled, gel particles having substantially no free liquid, said particles having an effective diameter of from about 0.05 to about 1.0 millimeter.

References Cited in the file of this patent

UNITED STATES PATENTS

| | | |
|---|---|---|
| 2,442,588 | D'Alelio | June 1, 1948 |
| 2,625,471 | Mowry et al. | Jan. 13, 1953 |
| 2,651,883 | Hedrick et al. | Sept. 15, 1953 |
| 2,651,885 | Hedrick et al. | Sept. 15, 1953 |
| 2,652,322 | Hendrick et al. | Sept. 15, 1953 |
| 2,652,323 | Mowry et al. | Sept. 15, 1953 |
| 2,703,276 | Hedrick et al. | Mar. 1, 1955 |
| 2,810,716 | Markus | Oct. 22, 1957 |
| 2,951,753 | Groves | Sept. 6, 1960 |
| 3,060,084 | Littler | Oct. 23, 1962 |
| 3,062,634 | Talbert | Nov. 6, 1962 |

FOREIGN PATENTS

| | | |
|---|---|---|
| 758,019 | Great Britain | Sept. 29, 1956 |